B. SLUSSER.
Earth-Scraper.
No. 209,720. Patented Nov. 5, 1878.
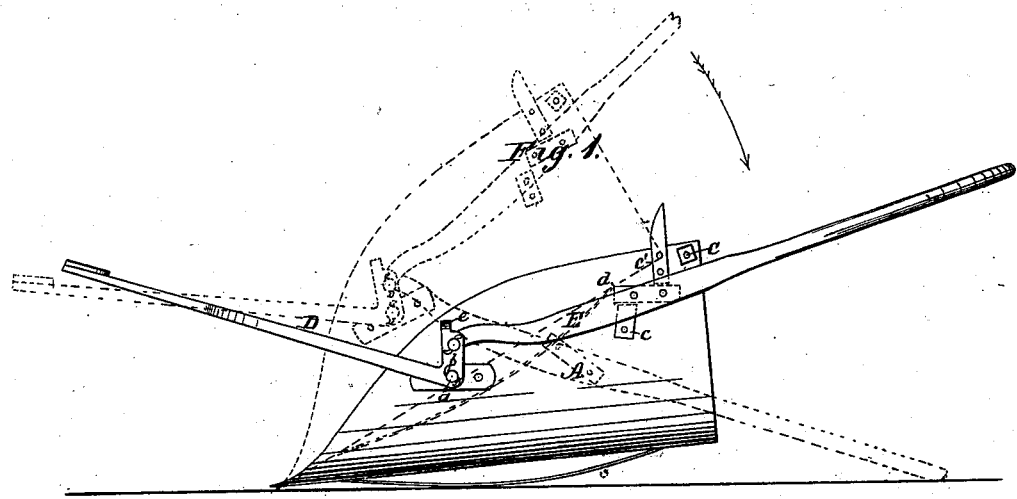
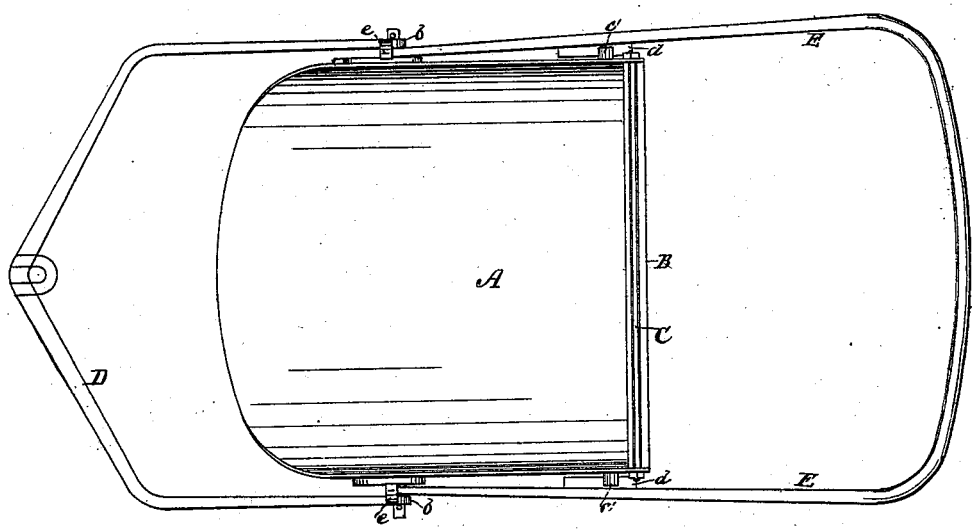
WITNESSES:
W. W. Hollingsworth
Edw. W. Byrn
INVENTOR:
Benj. Slusser
BY
ATTORNEYS.

UNITED STATES PATENT OFFICE.

BENJAMIN SLUSSER, OF SIDNEY, OHIO, ASSIGNOR OF ONE-HALF HIS RIGHT TO W. H. C. GOODE, OF SAME PLACE.

IMPROVEMENT IN EARTH-SCRAPERS.

Specification forming part of Letters Patent No. 209,720, dated November 5, 1878; application filed August 30, 1878.

*To all whom it may concern:*

Be it known that I, BENJAMIN SLUSSER, of Sidney, in the county of Shelby and State of Ohio, have invented a new and Improved Earth-Scraper; and I do hereby declare that the following is a full, clear, and exact description of the same, reference being had to the accompanying drawings, forming part of this specification, in which—

Figure 1 is a side elevation. Fig. 2 is a plan view.

This is an improvement in that class of earth-scrapers which are arranged to revolve for the purpose of dumping the load, and during the intervals, or while being filled, are locked in rigid position.

The improvement consists in pivoting the forward ends of the handle to an angular projection from the bail near its pivots, and locating near the rear of the scraper, upon each side, two vertically-arranged lugs, one of which projects to form a spur, and also locating upon the handle, at this point, a bar, which co-operates with the lugs on the scraper to lock it in rigid position, still allowing the scraper, by a slight adjustment of the handle, its proper revolution in dumping.

The improvement also consists in the peculiar means for preventing the handle from being thrown over with the scraper when revolving, as hereinafter more fully described.

In the drawings, A represents the scraper, which is made of sheet-steel, with a wooden back, B, and tie-rod C, the said scraper, as shown, being provided with rockers upon its bottom, to facilitate transportation and reduce wear, as heretofore employed. D is the bail, which is pivoted at *a* to metal trunnions rigidly fixed to the sides of the scraper. The rear ends of this bail have upon each side an angular projection, *b*, to which are pivoted the front ends of the handle E, which handle is bent around and formed of one piece.

To the rear edge of the sides of the scraper, and near the top, are firmly fixed lugs *c c'*. The general position of these lugs is vertical, and the upper one is beveled to a sharp edge, and is arranged to project above the edges of the scraper to form spurs, which, by engaging with the ground, assist the scraper in revolving. To the inner sides of the handle, about this point, are attached short bars *d*, whose general position, when the scraper is in its working position, is horizontal. These bars are made large enough to reach from the upper face of the lug *c* to the lower face of the lug *c'*, which lugs, as will be seen, are in different vertical planes, and the opposing faces of which are sufficiently far apart to receive the bar *d* between.

The operation of these devices is as follows: When the bar *d* is between the upper face of lug *c* and lower face of lug *c'*, the handle serves to lock the scraper upon its forward pivots, and this is the position which the scraper occupies while being filled or transported. When the scraper is to be dumped, however, the operator elevates the rear end of the handle, together with the scraper, the bail being held in position by the draft of the team, so that the angular projections at the rear ends of the bail force the handle back, and allow the bar *d*, attached to the handle, to pass horizontally to the rear until its edge next to the bail is off the face of the lug *c*, in which position the rear end of the scraper is free to rise and revolve, which it does from the engagement of the point of the scraper with the earth and the draft of the team.

To prevent the handle from being thrown over with the scraper and striking the heels of the team, an inwardly-projecting stop-lug, *e*, is formed upon the angular projection *b* of the bail, which lug *e* would be struck by the bail in its forward movement, and would constitute a stop for the same, which would prevent further forward movement.

In defining my invention with greater clearness, I would state that I am aware that a horizontal bar corresponding to *d* has been arranged upon the side of the scraper, and that lugs arranged in a manner similar to *c c'* have been fixed to the handle, which handle was pivoted to an extension from the bail in front, to operate upon the same general principle. When, however, the horizontal bar *d* is arranged upon the side of the scraper it catches and becomes clogged with dirt, which interferes with the locking and unlocking of the devices, and the width of the handle does not afford sufficient room for the spacing of the lugs without the addition of other parts.

By arranging the horizontal bar $d$ upon the handle it will be seen that it may be applied directly to the same, and in nearly longitudinal position therewith, while the location of the lugs $c\ c'$ on the scraper obviates the clogging of the same with dirt by reason of their vertical position, and also allows the upper one of the lugs to be utilized as a spur for assisting in the revolution.

I am also aware that the handle of a scraper has been prevented from turning over upon the heels of the team by a stop device arranged between the handle and the bail. With respect to this feature, therefore, I only claim the particular construction and arrangement of devices shown and described.

Having thus described my invention, what I claim as new is—

1. The combination of the bail having angular projection $b$, the handle E, pivoted to said angular projection and having bar $d$, and the scraper pivoted to the bail at $a$, and provided with vertical lugs $c\ c'$, one of which is made to project and form a spur, substantially as shown and described.

2. The combination of the scraper, the pivoted bail having angular projection $b$, with inwardly-extended lug $e$, and the handle E, pivoted to said angular projection, substantially as and for the purpose described.

BENJAMIN SLUSSER.

Witnesses:
A. W. BELLOW,
BENJ. F. MARTIN.